Nov. 10, 1925.          1,561,389

G. WOLLERS

REFLEX OVEN

Filed Feb. 7, 1924

Patented Nov. 10, 1925.

1,561,389

UNITED STATES PATENT OFFICE.

GEORG WOLLERS, OF ESSEN, GERMANY, ASSIGNOR TO FRIED. KRUPP AKTIENGESELL-SCHAFT, OF ESSEN-ON-THE-RUHR, GERMANY.

REFLEX OVEN.

Application filed February 7, 1924. Serial No. 691,326.

*To all whom it may concern:*

Be it known that I, GEORG WOLLERS, residing at Essen, Germany, a citizen of the German Empire, have invented a certain new and useful Improvement in Reflex Ovens, of which the following is a specification.

This invention relates to furnaces for gaseous combustion known as surface combustion (or flameless combustion) having a heat radiating burner consisting of refractory material and provided with a plurality of channels opening at the heat radiating surface thereof and a conduit for supplying a gas mixture to the burner. The invention has for its object to essentially increase the economy of such furnaces by the fact that a gas mixture heated near the self ignition point may be applied without prejudicing the security of working.

To this end there is employed in combination with means for preheating the gas mixture a mixing chamber arranged in said conduit and containing baffle means for whirling the constituents of the gas mixture.

The accompanying drawing illustrates, by way of example, a coke-oven constructed in accordance with the invention.

Figure 1:
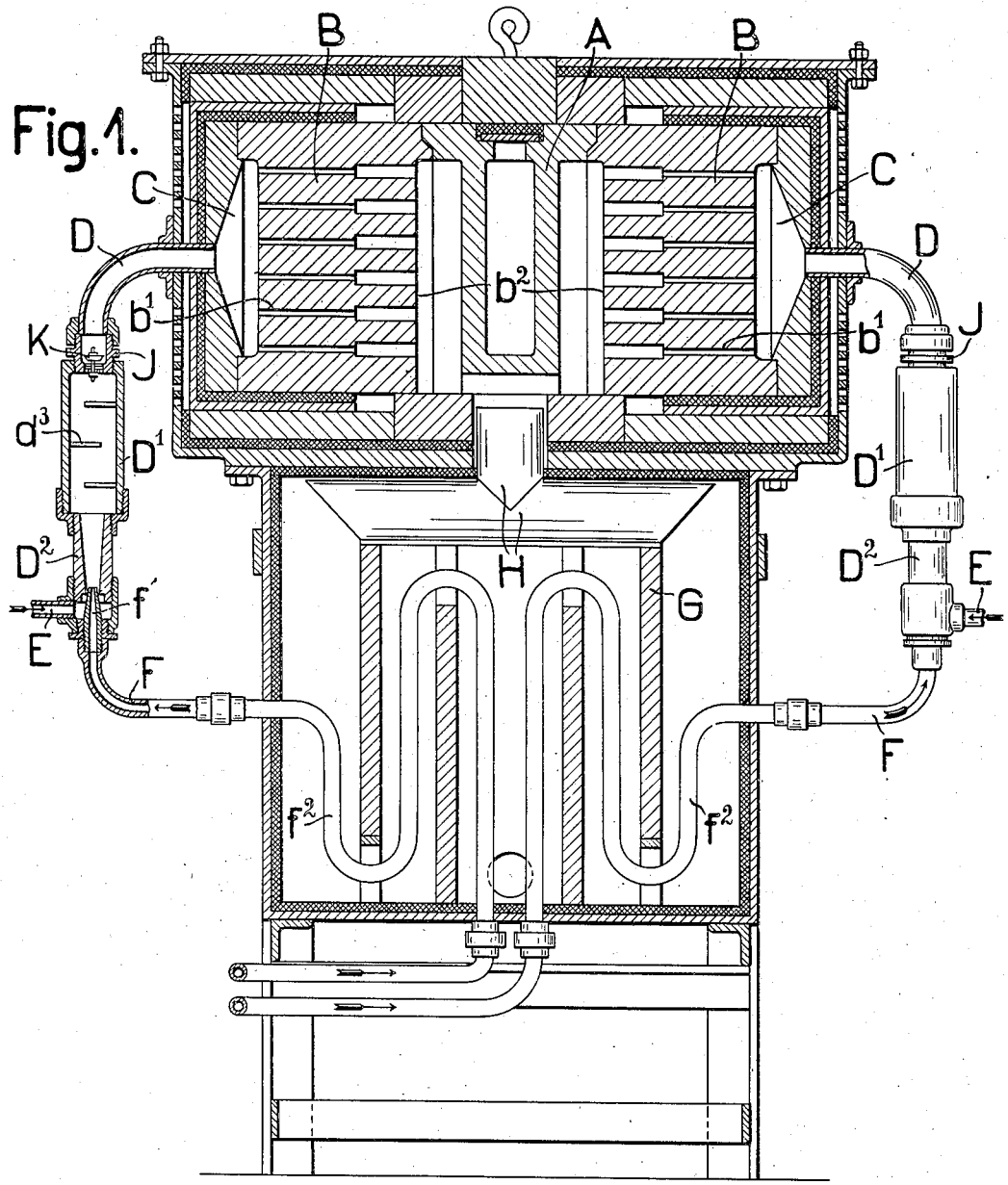
Fig. 1 is a vertical section through the coke-oven.

A is the receptacle to be heated which is designed to receive the fuel to be converted into coke and surrounded by the masonry of the oven which is provided with heat protecting layers. A burner B of refractory material for so-called surface or flameless combustion is arranged at each side of the receptacle A which as usual possesses an oblong rectangular cross-section, and extends in a direction vertical with relation to the plane of the drawing up to the head walls of the oven. Each burner B is provided with a plurality of horizontally extending channels $b^1$ which open at the heat radiating surface $b^2$ of the burner into a hollow space existing between the latter and the receptacle A. Arranged in front of each burner B is a distributing space C to which is connected the supply conduit for the gas mixture used for the heating and consisting of a combustible gas and air. The said supply conduit consists of a bend D fastened to the masonry of the oven, a mixing tube $D^1$ to be further described hereinafter and a communication pipe $D^2$ with which the gas pipe E and the air pipe F are connected. The air pipe F which opens into the communication pipe $D^2$ by means of a nozzle $f^1$ is guided in serpentine windings $f^2$ through a preheater G which is arranged underneath the receptacle A and the burners B and connected by the intermediary of a ⊥-shaped piece of pipe H with the hollow space existing between the receptacle A and the burners B.

Figure 2:
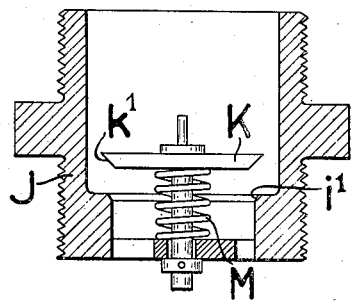
Fig. 2 is a detail of Fig. 1 on an enlarged scale.

The mixing tube $D^1$ is provided in its interior on different sides with transverse baffles $d^3$ arranged so as to form for the gas mixture passing through the tube a zig-zag way on which the gas mixture is subjected to repeated changes of direction and cross-section. Interposed between the mixing tube $D^1$ and the bend D is a check valve consisting of a valve casing J having a cone-shaped seat $i^1$ and a valve body K which is provided with a corresponding cone-shaped seating face $k^1$. The valve body is placed under the action of a spring M tending to hold the valve in the open position shown in Fig. 2 contrary to the pressure prevailing in the bend D and the distributing space C.

In each of the two conduits leading to the burners B the air preheated by the waste gases of the oven in the serpentine windings $f^2$ enters through the nozzle $f^1$ into the communication pipe $D^2$ in which it mixes with the combustible gas supplied by the conduit E. As the gas mixture is subjected to repeated changes of direction and cross-section by the baffles $d^3$ during its passage through the mixing tube $D^1$, it will be mixed so intimately that the mixture of gas passing through the check valve J K and the bend D into the distributing space C will possess everywhere in the latter the same ratio of mixture between gas and air. In case the quantity of gas and air supplied is properly measured, it will therefore be impossible that at some points of the conduit leading to the incandescent zone of the burner on account of an imperfect mixture a ratio of mixture arises causing self-ignition of the mixture at said points and in consequence thereof the explosion of the whole mixture; on the contrary, the combustion will take place without prejudicing the security of working at the highest temperature attainable with the given ratio of mixture. Besides, a working uniformity, of the oven, unreached hitherto is attained by the intimate mixing of the gas and air. Therefore, the invention is also particularly adapted for ovens for hardening and for producing low temperature tar with which a uniform working is of decisive importance.

Another essential advantage of the described oven consists in the fact that the utilization of the advantages of preheating the gas mixture is enabled in a reliable manner. It is a well-known fact that the economy of every gas-firing will be materially increased by preheating the gas mixture. However, in the furnaces for gaseous surface combustion known hitherto the preheating was much restricted because—on account of the danger of self-ignition producing a flame causing the explosion of the whole gas-mixture—the upper limit of the temperature of preheating was always determined by the comparatively low temperature at which a flashing up of the combustible mixture will be observed upon approaching an ignition flame to the same. Now, with the ovens according to the present invention, on account of the perfect safety against any self-ignition the said dangerous upper limit is but formed by the ignition point, which means the temperature at which the combustible mixture will ignite spontaneously without foreign ignition. The invention widely makes use of that circumstance by preheating in the preheater G at least one of the constituents of the gas mixture, f. i., the air, so much as to cause the gas mixture to possess in the mixing tube D a temperature which is much higher than the comparatively low temperature at which a flashing up of the combustible mixture will be observed upon approaching an ignition flame to the same.

Of course, it is wanted to be understood that the invention is not limited to ovens heated by a mixture of air and a combustible gas, but that instead of air any other mixture containing oxygen or even pure oxygen may be used.

Claims:

1. In a furnace for gaseous combustion known as surface combustion having a heat radiating burner consisting of refractory material and provided with a plurality of channels opening at the heat radiating surface thereof and a conduit for supplying a gas mixture to said burner, the combination with means for preheating the gas mixture before entering said burner of a mixing chamber arranged in said conduit and containing baffle means for whirling the constituents of the gas mixture.

2. In a furnace for gaseous combustion known as surface combustion having a heat radiating burner consisting of refractory material and provided with a plurality of channels opening at the heat radiating surface thereof and a conduit for supplying a gas mixture to said burner, the combination with means for preheating only one of the constituents of the gas mixture of a mixing chamber arranged in said conduit and containing baffle means for whirling the constituents of the gas mixture.

The foregoing specification signed at Essen, Germany, this 13th day of December, 1923.

GEORG WOLLERS.